No. 642,996. Patented Feb. 6, 1900.
L. J. MESSIER & E. J. MERCURE.
VARIABLE SPEED GEAR.
(Application filed June 24, 1899.)
(No Model.)

Witnesses
L. C. Hills
Alfred T. Gage

Inventors:
Louis J. Messier,
Euclid J. Mercure,
By E. B. Stocking
Attorney

THE NORRIS PETERS CO., PHOTO-LITHO., WASHINGTON, D. C.

UNITED STATES PATENT OFFICE.

LOUIS J. MESSIER AND EUCLID J. MERCURE, OF PITTSFIELD, MASSACHUSETTS, ASSIGNORS OF ONE-THIRD TO HIRAM H. DURGIN, OF SAME PLACE.

VARIABLE-SPEED GEAR.

SPECIFICATION forming part of Letters Patent No. 642,996, dated February 6, 1900.

Application filed June 24, 1899. Serial No. 721,703. (No model.)

*To all whom it may concern:*

Be it known that we, LOUIS J. MESSIER and EUCLID J. MERCURE, citizens of the United States, residing at Pittsfield, in the county of Berkshire, State of Massachusetts, have invented certain new and useful Improvements in Variable-Speed Gears, of which the following is a specification, reference being had therein to the accompanying drawings.

This invention relates to variable-speed gears, and is intended particularly for application to bicycles or similar structures embodying a chain-and-sprocket driving mechanism.

The invention has for its object to provide an improved form of shifting mechanism whereby the gear used may be changed from a high to a low gear while the machine is in motion and by the shifting of a single lever.

A further object of the invention is to provide an improved form of shifting lever and locking mechanism whereby the rider can conveniently shift and lock the driving mechanism for either high or low gear or disconnect said mechanism entirely.

Other objects and advantages of the invention will hereinafter appear in the following description, and the novel features thereof will be particularly pointed out in the appended claims.

Figure 1:
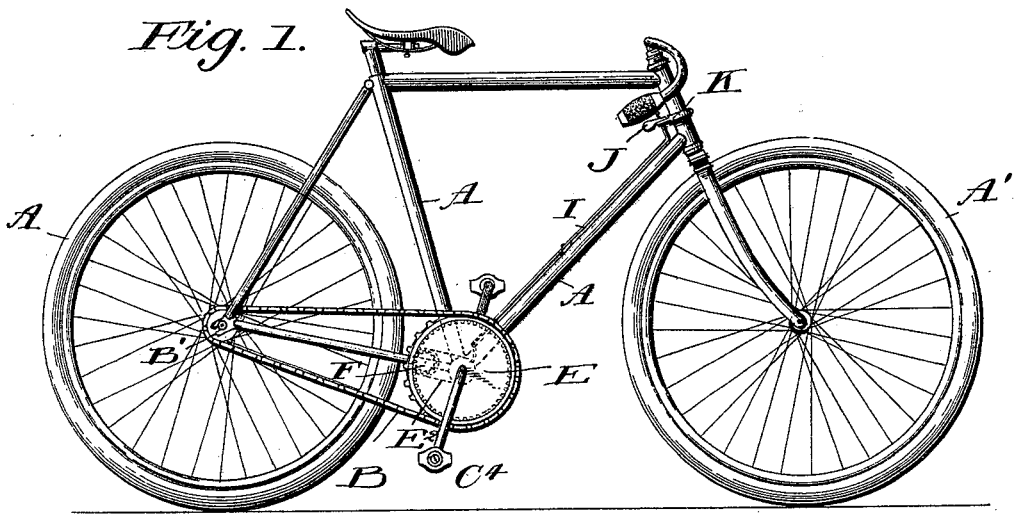
Figure 2:
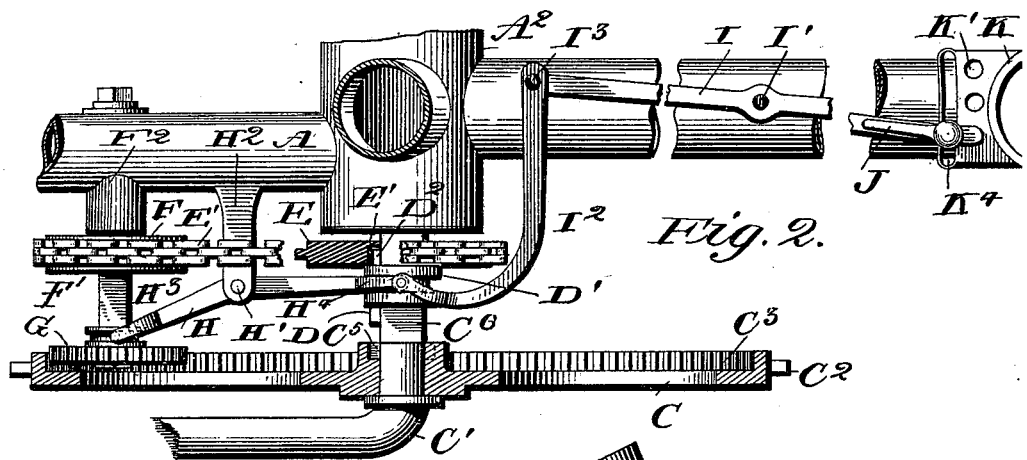
Figure 3:
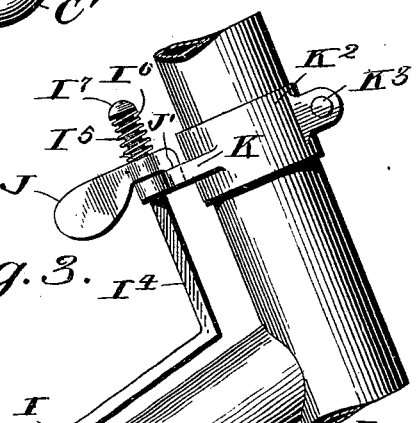

In the drawings, Figure 1 represents an elevation of a bicycle with this invention applied thereto. Fig. 2 is a plan view with parts in section and broken away, and Fig. 3 is an enlarged elevation of the shifting lever and locking device at the head of the bicycle.

Like letters of reference indicate like parts throughout the several figures of the drawings.

The letter A designates a frame of a bicycle, which is supplied with the usual wheels A', the rear one of which is positively driven by means of a sprocket-chain B, extending to a sprocket B' on the axle of said wheel. The chain B passes over a suitable sprocket-wheel C, located upon the crank-axle C' and having upon its periphery sprocket-teeth $C^2$ and upon the inner face of a lateral flange a series of gear-teeth $C^3$. The axle or crank-shaft is provided with the usual pedals $C^4$ and is journaled in the customary boxing $A^2$ at the lower portion of the frame A. The sprocket-wheel C is mounted upon the axle C', so as to freely rotate thereon, and is provided with a socketed collar $C^5$, adapted to be engaged by a lug or projection D upon a shifting clutch D'. The shaft C' is also provided with a second smaller sprocket-wheel E, also mounted to freely rotate on said shaft and provided with a socket E, adapted to receive a projection $D^2$ from the sliding clutch D'. By this structure it will be seen that when either sprocket-wheel is engaged by the clutch it will be positively rotated with the crank-axle. It may here be stated that the portion $C^6$ of this axle is angularly formed in order that the clutch member D' may be rotated therewith and yet capable of longitudinal movement thereon. The sprocket-wheel E is connected with a rear sprocket-wheel F, mounted upon an angular stub-shaft F' by means of a chain $E^2$. The shaft F' is suitably journaled in a box $F^2$, carried by the frame, and beyond the sprocket F a gear or pinion G is slidably mounted and provided with a shift-collar G', by which it may be moved longitudinally along the angular shaft F'. This pinion when in the position shown in Fig. 2 engages the gear-teeth $C^3$ upon the sprocket-wheel C, thereby driving the same at a lower speed than when said sprocket is rotated directly from the crank-axle.

For the purpose of shifting the gears hereinbefore described a particular construction and arrangement of levers has been provided. For the purpose of simultaneously moving and shifting both the clutch D and the pinion G a lever H has been provided, which is pivotally mounted at H' upon a support $H^2$, extending from the frame of the bicycle, and is provided at one end with a yoke $H^3$, engaging the collar G' on the pinion G, and at the opposite end with a similar yoke H', engaging the sliding clutch D'. The main shifting lever I is pivotally mounted upon the frame A of the bicycle, as at I', and connected at its lower end by a curved arm $I^2$ with the yoke $H^4$ of the lever H and the sliding clutch. This curved arm $I^2$ is pivoted at $I^3$ to the lower end of the lever I and extends around the smaller sprocket-wheel upon the crank-shaft. The lever may be shifted and held by any desired means, and we have illustrated a very convenient form of latch and handle for shifting and holding said lever. The upper end of the shifting lever I is bent at an angle to the body thereof, as shown at I⁴, and extends parallel with the head-post of the bicycle. The upper end I⁵ of this lever is of angular formation and has mounted thereon a vertically-sliding latch J, normally held at the limit of its downward movement by means of a spring I⁶, surrounding the portion I⁵ of the lever and held in position by means of a suitable cap I⁷. This latch J is provided with a point J′, adapted to seat in suitable recesses K′, formed in a plate K, which may be secured to the head-post of the bicycle in any suitable manner—for instance, by means of a band K² and clamping-lugs and bolt K³. The plate K is also provided with a guiding-slot K⁴, within which the portion I⁴ of the lever I is adapted to travel. It will be seen that a vertical movement of the latch J will disengage the same from the sockets K′ and permit the lever I to be shifted, and the extent of said shifting movement may be determined by bringing the latch J into coincidence with the proper one of the three sockets to either engage the high or low gear or completely disconnect the gear for coasting or otherwise.

In the operation of the bicycle when it is desired to drive the same at a high speed by the use of the sprocket C the clutch D′ is shifted until the latch J engages the socket at the extreme left of Fig. 2. This brings the lug D into engagement with the sprocket-collar and also simultaneously removes the pinion G from engagement with the gear-teeth. All of the parts are now idle except the main sprocket-wheel and its chain extending to the rear wheel, so that no unnecessary friction is occasioned in the ordinary operation of the bicycle, which is maintained in the simplest possible condition. If for the purpose of hill-climbing or other conditions present in bicycling it be desired to reduce the driving speed of the wheel, the lever I will be shifted to the extreme right, as shown in Fig. 2, thereby disengaging the sprocket C from the crank-axle C′ and engaging the smaller sprocket E, which in its rotation with the axle drives the sprocket F and gear-wheel G, which was simultaneously shifted into engagement with the gear-teeth upon the sprocket C as the sprocket E was engaged by the clutch. The power will now be applied to the periphery of the sprocket-wheel through the pinion G. When it is desired to disconnect the driving mechanism for any purpose, such as coasting or locking the wheel, the same may be effected by shifting the lever I until the latch engages the central socket. This removes the sliding clutch from both sprocket-wheels upon the crank-axle and also the gear G, so that said axle will rotate without any effect upon the driving mechanism.

It will be obvious that the shifting operation just described can be effected while the wheel is in motion and that the location of the driving and shifting mechanism within the small compass illustrated permits the same to be readily protected by a suitable covering and to be applied to an ordinary structure of bicycle without materially altering the frame thereof. Furthermore, when the shifting device is applied the general appearance of the wheel is not materially changed or encumbered with necessary mechanism, and the shifting lever and latch are located at such a position as to be readily operated by the rider by simply removing one hand from the handle-bar.

It is obvious that numerous changes may be made in the details of construction and configuration of the several parts without departing from the spirit of this invention as defined by the appended claims.

Having described our invention, what we claim as new, and desire to secure by Letters Patent, is—

1. A driving-gear for cycles comprising a crank-shaft, independent sprockets rotatably mounted thereon, a sliding clutch between said sprockets and adapted to engage either of the same, a series of gear-teeth upon one of said sprocket-wheels, an auxiliary shaft supporting a sprocket-wheel in line with one of said sprockets upon the crank-shaft, a driving-chain from the sprocket-wheel on the auxiliary shaft, a pinion on said auxiliary shaft adapted to engage said gear-teeth on said sprocket, and means for shifting said clutch; substantially as specified.

2. A driving-gear for cycles comprising a crank-shaft, independent sprockets rotatably mounted thereon, a sliding clutch between said sprockets and adapted to engage either of the same, a series of gear-teeth upon one of said sprocket-wheels, an auxiliary shaft supporting a sprocket-wheel in line with one of said sprockets upon the crank-shaft, a driving-chain from the sprocket-wheel on the auxiliary shaft, a pinion on said auxiliary shaft adapted to engage said gear-teeth on said sprocket, and a lever engaging said pinion and clutch to simultaneously shift the same in opposite directions; substantially as specified.

3. A driving-gear for cycles comprising a crank-shaft, independent sprockets rotatably mounted thereon, a sliding clutch between said sprockets and adapted to engage either of the same, a series of gear-teeth upon one of said sprocket-wheels, an auxiliary shaft supporting a sprocket-wheel in line with one of said sprockets upon the crank-shaft, a driving-chain from the sprocket-wheel on the auxiliary shaft, a pinion on said auxiliary shaft adapted to engage said gear-teeth on said sprocket, a lever engaging said pinion and clutch to simultaneously shift the same in opposite directions, and a main shifting lever pivoted to the frame of the wheel and connected to said clutch; substantially as specified.

4. A driving-gear for cycles comprising a crank-shaft, independent sprockets rotatably mounted thereon, a sliding clutch between said sprockets and adapted to engage either of the same, a series of gear-teeth upon one of said sprocket-wheels, an auxiliary shaft supporting a sprocket-wheel in line with one of said sprockets upon the crank-shaft, a driving-chain from the sprocket-wheel on the auxiliary shaft, a pinion on said auxiliary shaft adapted to engage said gear-teeth on said sprocket, a lever engaging said pinion and clutch to simultaneously shift the same in opposite directions, a main shifting lever pivoted to the frame of the wheel and connected to said clutch, a plate carried by the head-post of a cycle, and a latch upon said main shifting lever engaging said plate; substantially as specified.

5. In a cycle driving-gear, the combination with a crank-axle, of a main sprocket-wheel rotatably mounted upon said shaft and having gear and sprocket teeth thereon, a secondary sprocket rotatably mounted upon said shaft, a clutch slidably mounted on said shaft and rotatable therewith, a driving-sprocket mounted upon a shaft supported in the frame and connected to said secondary sprocket by a driving-chain, a pinion slidingly mounted upon the shaft of said sprocket and rotatable therewith, a lever pivoted between said pinion and clutch upon a support from the frame, a main shifting lever pivoted upon the frame, and a link connecting said lever and clutch; substantially as specified.

6. In a cycle driving-gear, the combination with a crank-axle having round portions and an intermediate angle portion, of sprocket-wheels mounted upon said round portions, one of which is provided with an internal gear, a sliding clutch mounted upon the angle portion between said sprocket-wheels, an angular stub-shaft mounted in the frame and having secured thereto a driving-sprocket connected by a chain to one of the sprockets on said crank-axle, a driving-pinion slidably mounted upon the angular portion of said stub-axle to engage said internal gear, and means for shifting said pinion and clutch; substantially as specified.

7. In a cycle driving-gear, the combination with a shifting clutch and coöperating mechanism, of a shifting lever pivoted to the frame of the wheel and connected to said clutch, a latch slidingly mounted upon a vertical portion of said lever, a guide-plate carried by the head of a cycle having a slot through which said lever extends, and a series of sockets adapted to be engaged by said latch; substantially as specified.

8. In a cycle driving-gear, the combination with a shifting clutch and coöperating mechanism, of a shifting lever pivoted upon the frame of a cycle and having a vertical portion parallel with the head-post of the machine, a vertically-movable latch mounted upon said lever, a spring acting upon the upper portion of said latch, and a locking-plate secured to the head of the wheel by a clamping-band and provided with a guiding-slot for the vertical end of the shifting lever, and a series of sockets to be engaged by said latch; substantially as specified.

In testimony whereof we affix our signatures in presence of two witnesses.

LOUIS J. MESSIER.
EUCLID J. MERCURE.

Witnesses:
R. B. BARDWELL,
JOS. E. PURCHES.